(12) United States Patent
Wang

(10) Patent No.: US 7,848,000 B2
(45) Date of Patent: Dec. 7, 2010

(54) BIREFRINGENT SPECTRAL FILTER WITH WIDE FIELD OF VIEW AND ASSOCIATED COMMUNICATIONS METHOD AND APPARATUS

(75) Inventor: Xinghua Wang, Pittsburgh, PA (US)

(73) Assignee: ChemImage Corporation, Pittsburgh, PA (US)

(*) Notice: Subject to any disclaimer, the term of this patent is extended or adjusted under 35 U.S.C. 154(b) by 855 days.

(21) Appl. No.: 11/621,166

(22) Filed: Jan. 9, 2007

(65) Prior Publication Data

US 2007/0166045 A1 Jul. 19, 2007

Related U.S. Application Data

(60) Provisional application No. 60/757,268, filed on Jan. 9, 2006.

(51) Int. Cl.
 *G02F 1/07* (2006.01)
 *G02B 5/30* (2006.01)
(52) U.S. Cl. .......................... 359/256; 359/494
(58) Field of Classification Search ................. 359/256, 359/494, 497, 498, 246, 248, 254, 499, 253; 349/18, 61, 97, 106, 117, 119
See application file for complete search history.

(56) References Cited

U.S. PATENT DOCUMENTS

| 3,647,279 A | 3/1972 | Sharpless et al. |
|---|---|---|
| 4,197,008 A | 4/1980 | Pinnow et al. |
| 4,256,373 A | 3/1981 | Horimoto |
| 4,394,069 A | 7/1983 | Kaye |
| 4,848,877 A | 7/1989 | Miller |
| 5,181,135 A | 1/1993 | Keeler |
| 5,247,378 A | 9/1993 | Miller |
| 5,295,016 A | 3/1994 | Van Deventer |

(Continued)

FOREIGN PATENT DOCUMENTS

WO    WO 02/244800    6/2002

OTHER PUBLICATIONS

Ammann, "Synthesis of Optical Birefringent Networks". Progress in Optics IX pp. 123-177 (1971).

(Continued)

*Primary Examiner*—Ricky L Mack
*Assistant Examiner*—Tuyen Q Tra
(74) *Attorney, Agent, or Firm*—Duane Morris LLP

(57) ABSTRACT

A spectral filter is adapted for use in a receiver, for example in a short range submarine laser signal path, wherein the relative orientations of the receiver is such that the signal may appear diffusely or at an unknown point in a wide external field of view around an optical axis of the receiver. A narrow band spectral filter in the receiver has cascaded stages of tunable retarders with includes multi-conjugate stages that tolerate light that is oblique to normal, up to a diverging internal field of view angle up to about 10°. A fisheye lens assembly refracts incoming light from a wider external field of 170° or more and directs the light into the filter over the narrow internal field of view. Calibration and feedback control can be provided to stabilize the discriminated wavelength peak, which remains at the same center wavelength over the span of the internal field of view notwithstanding the difference in retarder thicknesses traversed along paths that are normal to the retarders versus oblique to the optical axis.

8 Claims, 6 Drawing Sheets

U.S. PATENT DOCUMENTS

| | | | |
|---|---|---|---|
| 5,387,920 | A | 2/1995 | Bos et al. |
| 5,483,387 | A | 1/1996 | Bauhahn et al. |
| 5,689,317 | A | 11/1997 | Miller |
| 5,892,612 | A | 4/1999 | Miller et al. |
| 5,943,129 | A | 8/1999 | Hoyt et al. |
| 5,953,083 | A | 9/1999 | Sharp |
| 5,953,087 | A | 9/1999 | Hoyt |
| 6,028,656 | A | 2/2000 | Buhrer et al. |
| 6,091,462 | A | 7/2000 | Sharp et al. |
| 6,172,722 | B1 | 1/2001 | Sharp |
| 6,310,673 | B1 | 10/2001 | Sharp |
| 6,373,568 | B1 | 4/2002 | Miller et al. |
| 6,373,614 | B1 | 4/2002 | Miller |
| 6,403,947 | B1 | 6/2002 | Hoyt et al. |
| 6,417,892 | B1 | 7/2002 | Sharp et al. |
| 6,421,131 | B1 | 7/2002 | Miller |
| 6,455,861 | B1 | 9/2002 | Hoyt |
| 6,501,548 | B1 | 12/2002 | Oldenbourg |
| 6,535,257 | B2 | 3/2003 | Miller |
| 6,552,836 | B2 | 4/2003 | Miller |
| 6,566,143 | B2 | 5/2003 | Hoyt |
| 6,665,072 | B2 | 12/2003 | Hoyt |
| 6,674,527 | B2 | 1/2004 | Hoyt |
| 6,693,710 | B1 | 2/2004 | Hoyt |
| 6,734,962 | B2 | 5/2004 | Treado et al. |
| 6,760,475 | B1 | 7/2004 | Miller |
| 6,781,736 | B2 | 8/2004 | Hoyt et al. |
| 6,927,834 | B2 | 8/2005 | Deary et al. |
| 6,985,216 | B2 | 1/2006 | Treado et al. |
| 6,992,809 | B1 | 1/2006 | Wang et al. |
| 6,999,155 | B2 | 2/2006 | Tillin et al. |
| 2001/0033376 | A1 | 10/2001 | Hoyt |
| 2003/0098918 | A1 | 5/2003 | Miller |
| 2003/0117705 | A1 | 6/2003 | Hoyt |
| 2007/0024779 | A1 | 2/2007 | Sharp |

OTHER PUBLICATIONS

Beckers, et al., "Observing the sun with a fully tunable Lyot-Ohman filter". Applied Optics, vol. 14, No. 9 pp. 2061-2066 (1975).

Call, et al., "Application of a Liquid Crystal Tunable Filter to Near-Infrared Spectral Searches". SETICon02 (2002).

Chu, et al., "Birefringent filter synthesis by use of a digital filter design algorithm". Applied Optics, vol. 41, No. 17 pp. 3412-3418 (2002).

Deng, et al., "Inhomogeneous distribution of brightness in the split-element filter". Applied Optics, vol. 36, No. 7 pp. 1576-1579 (1997).

Evans, "The Birefringent Filter". J. Opt. Soc. Amer., vol. 39, No. 3 pp. 229-242 (1949).

Harris, et al. "Optical Network Synthesis Using Birefringent Crystals". I. Synthesis of Lossless Networks of Equal-Length Crystals. J. Opt. Soc. Am. vol. 54, No. 10 pp. 1267-1279 (1964).

Katzenstein, et al., "Realization of a New Type of Birefringent Filter". Applied Optics, vol. 10, No. 5 pp. 1119-1124 (1971).

Leroy, "Solc Elements in Lyot-Oehman Filters". J. Optics vol. 11, No. 5 pp. 293-304 (1980).

Lyot, "Comptes rendus hebdomadaires des seances de Acadamie des science". pp. 1593-1595 (1933).

Preuss, et al., "Three-stage birefringent filter tuning smoothly over the visible region theoretical treatment and experimental design". Applied Optics, vol. 19, No. 5 pp. 702-710 (1980).

Saeed, et al., "Multispectrum, spatially addressable polarization interference filter". J. Opt. Soc. Am. A, vol. 19, No. 11 pp. 2301-2312 (2002).

Scheffer, "New multicolor liquid crystal displays that use a twisted nematic electro-optical cell". J. Appl. Phys., vol. 44, No. 11 pp. 4799-4803 (1973).

Shabtay, et al., "Tunable birefringent filters—optimal iterative design". Optics Express, vol. 10, No. 26 pp. 1534-1541 (2002).

Solc. "Birefringent Chain Filters". Opt. Soc. Am. vol. 55, No. 6 pp. 621-625 (1965).

Staromlynska, et al., "High-performance tunable filter". Applied Optics, vol. 37, No. 6 pp. 1081-1088 (1998).

Title, et al. "Tunable birefringent filters". Opt. Eng. 20(6), pp. 815-823 (1981).

Wang, et al., "Optimal design of birefringent filter with a flat-top passband". J. Opt. A: Pure Appl. Opt. 8 pp. 652-656 (2006).

Wu, "Design of a liquid crystal based electrooptic filter". Applied Optics, vol. 28, No. 1 pp. 48-52 (1989).

Wu, et al., "Liquid-crystal-based switchable polarizers for sensor protection". Applied Optics, vol. 34, No. 31 pp. 7221-7227 (1995).

Yariv, et al. "Optical Waves in Crystals". Chapter 5 (1984).

Ye, "Liquid-crystal bandpass filter based on the optical rotary dispersion effect". Applied Optics, vol. 34, No. 20 p. 4007-4010 (2004).

Ye, "Low-loss birefringent spectral filters comprising three identical retarders". Applied Optics, vol. 45, No. 31 pp. 8044-8051 (2006).

Ye, "Low-loss tunable filter based on optical rotary dispersion". Applied Optics, vol. 45, No. 6 p. 1162-1168 (2006).

Zhou, et al., "Nearly-off-axis transmissivity of Solc birefringent filters". J. Opt. Soc. Am. A, vol. 20, No. 4 pp. 733-740 (2003).

The entire International Search Report (ISR) in a counterpart foreign application received for ISA/US.

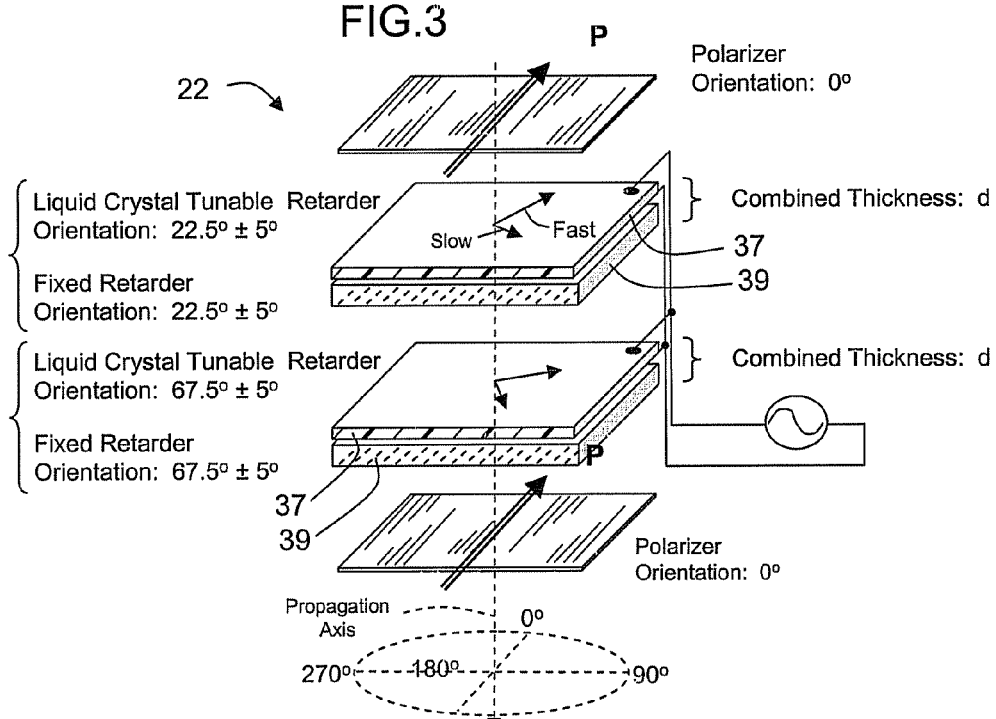
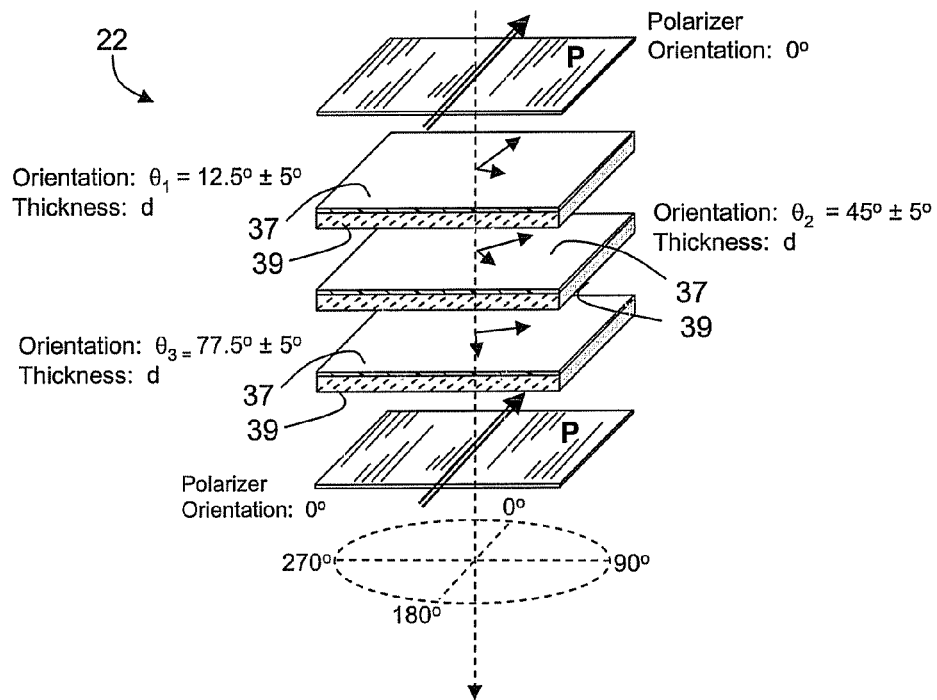

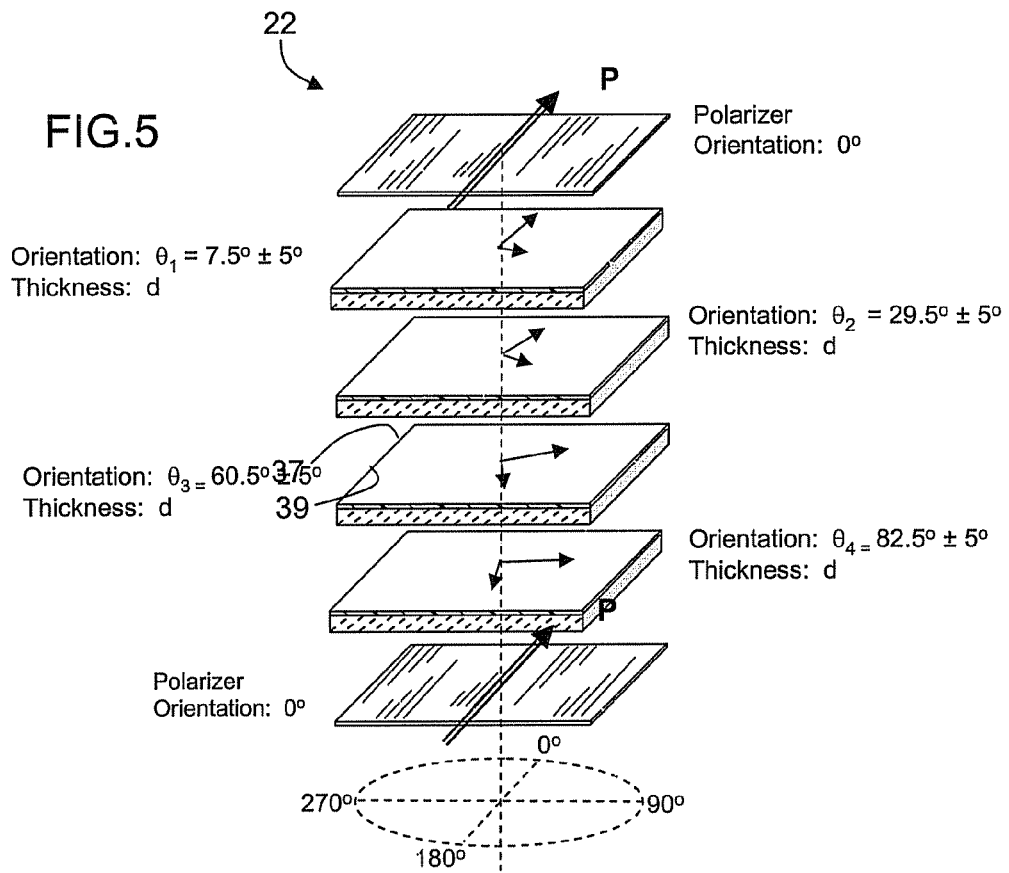
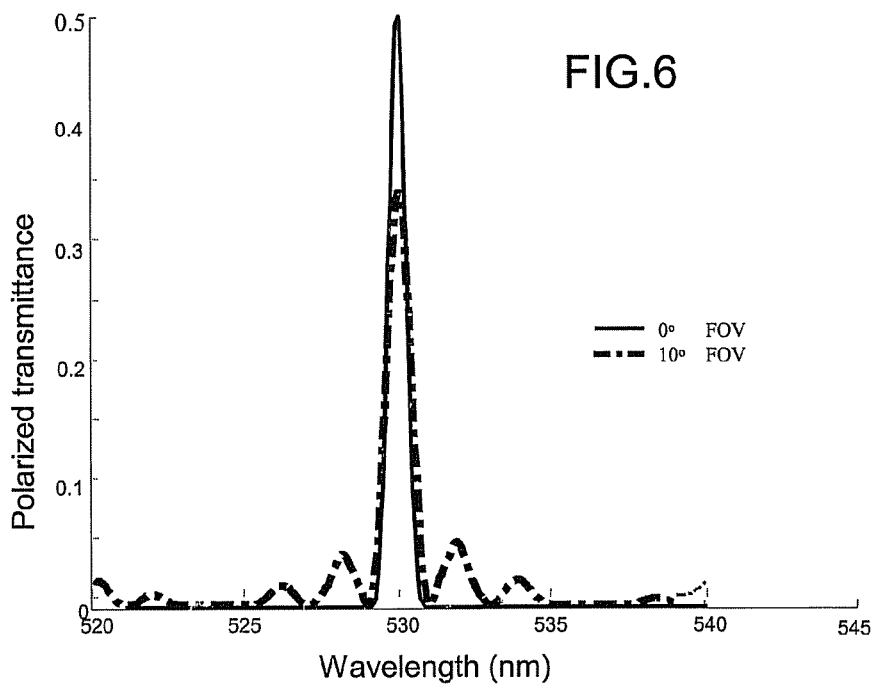

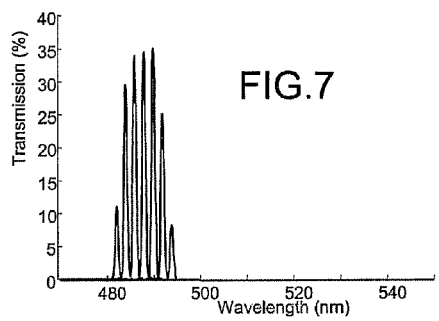
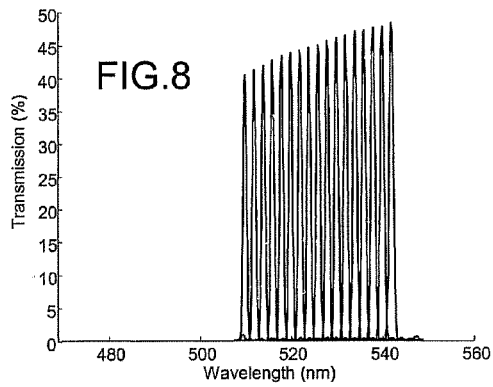
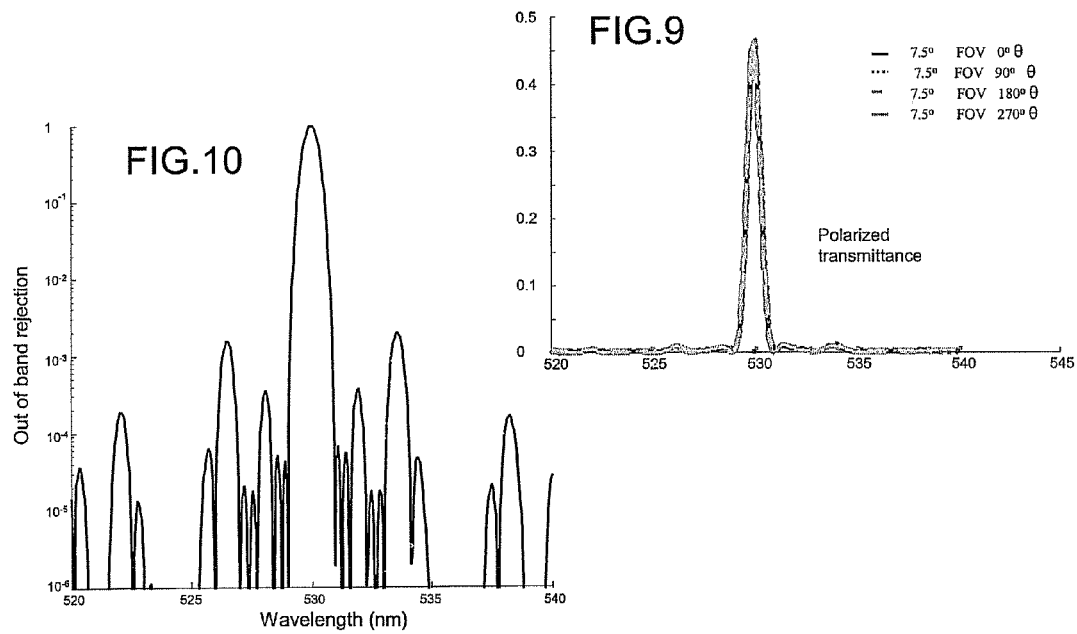

BIREFRINGENT SPECTRAL FILTER WITH WIDE FIELD OF VIEW AND ASSOCIATED COMMUNICATIONS METHOD AND APPARATUS

CROSS REFERENCE TO RELATED APPLICATION

This application claims priority of U.S. Provisional Application 60/757,268, filed Jan. 9, 2006.

BACKGROUND

This disclosure concerns optical wavelength filters for narrow bandwidth discrimination. An optical receiver is provided with a receiving lens assembly coupled to a birefringence and polarization optical wavelength filter having stacked retarders configured for tolerance to obliquely propagating light. The receiver is apt for a laser receiver operating in a diffuse medium, such as a short range undersea optical receiver responsive to modulated blue-green short wavelength laser communications. The receiver also is applicable to situations wherein a direct line of sight from the source to the receiver is uncertain and can be oblique to the optical signal path at the receiver.

A tunable multi-conjugate birefringence wavelength filter is disclosed in U.S. Pat. No. 6,992,809, which is incorporated in this disclosure in its entirety. In a filter as described therein, birefringent retarder plates are placed at predetermined rotational orientations, with associated polarizers at complementary orientations. The set of elements, comprising plural retarders and at least one polarizer, is configured such that certain wavelengths emerge at a polarization orientation that is aligned to the polarizer. Those wavelengths are transmitted. Wavelengths emerging orthogonal to the polarizer are blocked. Periodically related wavelengths emerge with the same orientation, and as a result, the filter transfer function is characteristically comb shaped.

Two or more filter stages as described can be placed sequentially, each comprising stacked retarders between polarizers at specific rotational orientations, to provide cascaded filter stages. The output or selection polarizer of one stage functions as the input polarizer determining the polarization alignment of the passband wavelength as transmitted to the next stage in cascade. According to one disclosed embodiment, at least one birefringent retarder plate stage is cascaded with a dielectric wavelength filter stage.

The transmission functions of cascaded stages multiply. If bandpass peaks in two cascaded stage transmission functions overlap, the result is a narrower bandpass peak and improved discrimination between the passband wavelength and out of band wavelengths. Where a bandpass peak in the transmission function of one stage corresponds to a stop band in the other stage, the bandpass peak is eliminated, adding to the free spectral range between other bandpass peaks.

For broadband light of a given polarization state, propagation through a birefringent retarder causes a change in polarization state that varies as a function of wavelength. Birefringence is an optical quality of certain crystals, such as calcite. Birefringent materials have orthogonal axes that have different optical indices. The two axes are sometimes termed the fast and slow axes. Effectively, the propagation speed of light is different for light waves that are aligned to one or the other of the respective birefringence axes.

An electromagnetic light wave likewise has orthogonal components. The relative amplitudes and the phase relationship between orthogonal light wave components define the polarization state of the light wave. It is possible that only one component may be present, such that the light is plane polarized parallel to that component. Similarly, two orthogonal components might be present at equal amplitude and in phase (or out of phase by an integer multiple of $\pi$ radians), which corresponds to being plane polarized at 45°. There are various other possible arrangements including circular polarization (out of phase by $\pi/2$ radians), elliptical polarization (unequal amplitudes) etc. A plane polarized light signal can pass through a polarizer that is aligned to the polarization orientation of the light signal. A polarizer orthogonal to the plane polarized light signal will block transmission. Between these angles, a vector component parallel to the polarizer is transmitted and a vector component perpendicular to the polarizer is blocked.

When light wave components propagate through a birefringent material having distinctly different optical indices along orthogonal fast and slow axes as described, the vector components that are parallel to the fast axis propagate through the birefringent material more quickly than the components that are parallel to the slow axis. Therefore, propagation through the birefringent material alters the polarization state of the light wave by causing differential retardation. The amount of differential retardation varies as a function of the birefringence value and the thickness of the birefringent material. The retardation can be stated in units of time or propagation distance. Time and/or distance are variables that are independent of wavelength. However, a given propagation time or distance corresponds to a greater phase angle at a relatively shorter wavelength and a smaller phase angle at a relatively longer wavelength. The phase angle of the differential retardation is the pertinent parameter when considering a change in polarization alignment, not the differential time or distance. Thus, a differential retarder causes a change in polarization state that varies with wavelength.

A birefringent filter is configured so that a particular change in polarization state is achieved only in the particular wavelength bands to be discriminated by a selection polarizer. In cascaded stages, the selection polarizer of a given stage determines the input polarization state applied to the next stage. Each cascaded stage improves discrimination by narrowing the pass bandwidth (usually measured as the full width at half maximum or "FWHM") and increasing the free spectral range ("FSR") between peaks.

There are several standard configurations for stacked retarder birefringent filters that differ with respect to relative retarder plate thicknesses (e.g., equal thicknesses versus d:2d:d), rotational angles (e.g., rocking angles versus successively advanced angles), polarizer angles (parallel to input versus perpendicular). Examples are the Solc, Lyot and Evans configurations. Alternative arrangements are also possible.

Each tunable retarder in a stack generally comprises a tunable liquid crystal element paired with a fixed crystal retarder, wherein the fast and slow axes of the fixed and tunable retarders are aligned. Thus, increasing or decreasing the birefringence of the liquid crystal has the same effect as might be achieved by an thicker or thinner retarder, respectively. All the tunable paired retarders in a stack are tuned in unison. Therefore, if the filter configuration dictates retarders of equal birefringence, for example, (normally equal thicknesses), then tuning in unison increases or decreases the effective thickness of all the stacked retarders in the stack, maintaining the necessary relationship dictated for the filter configuration (equal thickness in this example) but changing the wavelength of the pass bands. Tuning to increase or decrease birefringence expands or contracts the comb filter transmission characteristic.

The stacked retarders comprise parallel plates. A light beam propagating along a central axis normal to the parallel planes of the plates passes through a thickness that is equal to the plate thickness. Similarly, collimated light from an image may be passed through the filter, whereby the light propagates along lines parallel to the central axis. In that case, the light beams pass along lines normal to the retarder plates.

A complication arises if the light from a source is directed through the filter along paths that are not parallel to the center axis, i.e., propagating along lines that are oblique to a line that is normal to the planes of the retarders. If light propagates along lines that diverge from a focal point, for example, the traversed thickness of a retarder plate is equal to the retarder thickness at a center axis, but is progressively thicker for light propagating at progressively more oblique angles. In the case of light from a wide field of view, incoming light beams that are parallel a line normal to the filter (in the center of the field of view) propagate through only the thickness of the plate. Light beams from the periphery of the field of view propagate diagonally through the plate, for example from the perimeter of the field of view, and thus should pass through a greater thickness of the retarders.

The transmission characteristics of the filter are a function of birefringence and thickness of the retarder plates. Therefore, propagation of different beams through different thicknesses produces different bandpass wavelengths over the field of view. It would be advantageous to provide a technique to obviate this problem so as to filter for the same or nearly the same bandpass wavelength over the field of view.

SUMMARY

An object of the present disclosure is to maintain a wide field of view in an optical receiver having a spectral filter, to accommodate reception of light on lines oblique to a center optical axis. The spectral filter has birefringent retarder plates wherein birefringence is affected by thickness, and obliquely propagating rays traverse a greater thickness than normal rays, tending to de-tune the filter with respect to oblique rays. A biaxial film is possible wherein the birefringence varies as a function of radial displacement from a center axis normal to the plates proceeding along the successive plates. Thus, in an arrangement wherein light is caused to diverge from a focal point, the light at progressively greater oblique angles radiating from the focal point can traverse portions of the retarder plates with a complementary variation in birefringence. It is an object to provide additional ways to provide a filter wherein the bandpass peak (or bandstop peak) remains acceptably nominal over the range of normal to oblique input angles in the field of view.

One known application of a birefringent wavelength filter is to provide spectral filtering in association with imaging. The present disclosure is most suited for spectral filtering in connection with demodulating one signal rather than discriminating for each pixel in an array. A signal might be directed along a line of sight using a laser beam, and the spectral filter could be oriented so that the received light propagates through the filter on an axis normal to the planes of the stacked retarders. A more complicated geometry may be involved if the signal to be received is not oriented along a predetermined axis.

Conventional technology has limitations in high data rate communication between mobile platforms wherein a line of sight for a beam is not established. This situation may arise in space or open air communications, and in subsurface communications under water. Acoustic signaling is possible under water, but underwater conditions are unsuited to most forms of electromagnetic signaling, with the exception of very low frequency signals, which inherently are limited to a low data rate, and blue-green visible spectrum optical communications.

A free space laser communication system operating in relatively short wavelengths such as the blue-green portion of the spectrum has the potential to transmit at a very high data rate. A line of sight would appear to be required, and if either or both of the sending and receiving ends are not fixed in position, the orientation of propagating beam can present issues at the receiver, Light propagating under water is affected by scattering influences and the like, unlike substantially unobstructed laser communications in air or space. Scattering of light energy occurs due to the variations in the refractive index of sea water. Undersea currents, entrained particles, changing salt concentrations and temperature variations all can lead to scattering of both a laser signal that might be transmitted, and also sun light. Scattering of the signal reduces the amplitude subject to reception. Scattering of sunlight reduces the signal to noise ratio.

Undersea laser communications with wavelength filters have been attempted. The filters have been based on Cs and K atomic line filters and quartz and CdS birefringence filters with classic Lyot and Solc filter configurations. The most readily available laser sources for such applications are doubled Nd:YAG (532 nm) and doubled fiber lasers (around 530 nm). These filters have not been characterized by the large field of view, high out-of-band rejection ratio, wide free spectral range (i.e., a broad range of rejection between bandpass peaks of a comb filter transmission characteristic, an adequately narrow bandwidth, and a high transmission ratio in the desired passband.

Among other objects, an underwater communication link is desired that operates in sunlight for signaling between submerged points. Although shading may help to reduce overhead sunlight, scattered sunlight remains a problem that is addressed. Scattering of the signal directed from sender to the receiver is also addressed, particularly in connection with arrangements that permit effective signal reception along an uncertain signal propagation path.

An aspect of the disclosure is to provide wavelength receiver, having birefringent retarder plates and polarizers, that is relatively insensitive to the propagation direction of received light (i.e., reception is enabled over a relatively wide angular field of view). This is accomplished by refractive optics (lenses) that reduce the angle of diversion of light propagating through wide angle input optics, together with a birefringent retarder stack and polarizer type wavelength filter that is relatively tolerant of an off-axis light propagation path.

The retarder stack and polarizer type of wavelength filter has a narrow bandpass characteristic. The filter can select for light at a predetermined wavelength, i.e., the known or tunably selected wavelength of a laser, enabling maximum signal reception while out of band light, such as the greater part of diffuse broadband sunlight background light, is blocked with a high rejection ratio.

According to another aspect, a cascaded succession comprising birefringent retarder plates at selected rotational orientations to complement polarizers, can further comprise one or more dielectric spectral filters.

One applicable object is to select for the desired narrow band wavelength light signal. Another object is to open the field of view insofar as possible to draw in as much of the incident signal as can be reasonably obtained, notwithstanding scattering due to the diffuseness and similar characteristics of the medium. Thus what is needed is a wavelength filter characterized, at the same time, by both a narrow wavelength bandpass and a large field of view, for example of 45° or more.

A classic configuration Solc, Lyot, Evans or other traditional narrow bandpass filter based on birefringent retarders and interference has only a few degrees of field of view. This characteristic might be expected because such filters rely on the coordinated differential retardation of orthogonal light components. The retardation is a function of birefringence and thickness. Off-axis light (light propagating in a direction that is not parallel to the normal axis) must traverse a greater thickness than light normal to the axis. Thus light inclined to the axis will pass through a filter characterized by greater retardation than light oriented normal to the axis. The wavelength of the passband shifts as a function of the angle of incidence relative to the center axis.

At large angles, the transmission peak wavelength shifts substantially. If the transfer function is averaged over the field of view, the full width half maximum bandwidth becomes wider than would be experienced with a narrow field of view. Conversely, out of band rejection diminishes as the field of view is opened out and the incident angle of a portion of the input light becomes larger.

Thus, it is desirable to design and develop a new filter or filter system for successful undersea laser communication that can overcome the limitations of the current filter technology in terms of providing high transmission, narrow bandwidth, high out-of-band rejection ratio, large rejection wavelength range, and a large FOV.

It is also desirable to provide such a filter or filter system wherein the center wavelength is tunable. This can accommodate reception from different lasers and a choice of sources and wavelengths that best suits the particular undersea conditions that are encountered, e.g., with respect to salt concentration, water temperature and water current speed.

Tuning also can be used to offset any shift in the center wavelength of the interference filter at the receiver with changes in ambient temperature. According to one embodiment, tuning based on feedback to maximize the bandpass amplitude can provide a self-calibration feature to offset temperature based shifting of the bandpass center wavelength, maximizing the level of signal obtained.

In general, it is an object of the disclosure to provide a communications apparatus with a filter and associated methods steps having capabilities and specifications apt for undersea, diffuse media and variable line of sight narrow wavelength band communications. For these purposes, a tunable dual bandpass filter is provided that is useful at green-blue laser wavelength that are subject to transmission in water. A tuning resolution of as little as about 0.01 nm can be provided. In one embodiment, random selection between green and blue wavelengths is provided to permit choice of an optimal wavelength for transmission. A narrow pass band wavelength span is possible (FWHM=0.7 nm) together with a high transmission ratio (30 to 50%) for input light at a reference polarization alignment.

As aspects that tolerate operation in diffuse media (scattering) and an uncertain azimuth and bearing between a signal source and the disclosed receiver, a wide acceptable field-of-view angle (greater than ±40° oblique to a propagation axis at the receiver) is provided using an input lens and a spectral filter configuration that maintains a peak central wavelength without undue drift within the field of view (FOV) and while maintaining high out-of-band rejection (e.g., 1000:1) over a wavelength range down into UV wavelengths.

The optics are scalable to large aperture (up to 3") for high light collection efficiency. Techniques are provided for self-calibration and self-diagnostic aspects to achieve stabilized performance over large temperature range. To further improve light collection efficiency and improve transmission ratio, reflective paths are arranged for recycling light in the bandpass wavelength when blocked by polarizers contained in the filter.

BRIEF DESCRIPTION

There are shown in the drawings a number of examples and embodiments for purposed of illustration. However, reference should be made to the appended claims rather than the disclosed examples to assess the scope of the subject matter. In the drawings, FIG. 1 is a schematic cross section showing component parts of a tunable birefringent filter and the resulting light propagation paths, according to one embodiment of the present disclosure.

FIG. 3 is a schematic illustration of a configuration of rotationally oriented tunable birefringent retarder plates (two being shown) and polarizers forming a spectral filter stage that may be one of plural stages in cascade.

FIG. 4 is a schematic view corresponding to FIG. 3, wherein a filter stage has three tunable retarders.

FIG. 5 is a schematic illustration of a filter stage embodiment with four stacked retarders.

FIG. 6 is a plot of transmittance versus field of view for an embodiment as in FIG. 5.

FIGS. 7 and 8 are plots of transmission versus wavelength when tuned to incrementally different center wavelengths (one peak at a time), and together showing a bandpass envelope over the blue/green ranges of interest.

FIG. 9 is a plot of transmittance for polarized components over external and internal fields of view at a given center wavelength.

FIG. 10 is a plot of out-of-band rejection versus wavelength, tuned as in FIG. 9.

DETAILED DESCRIPTION

Figure 1:
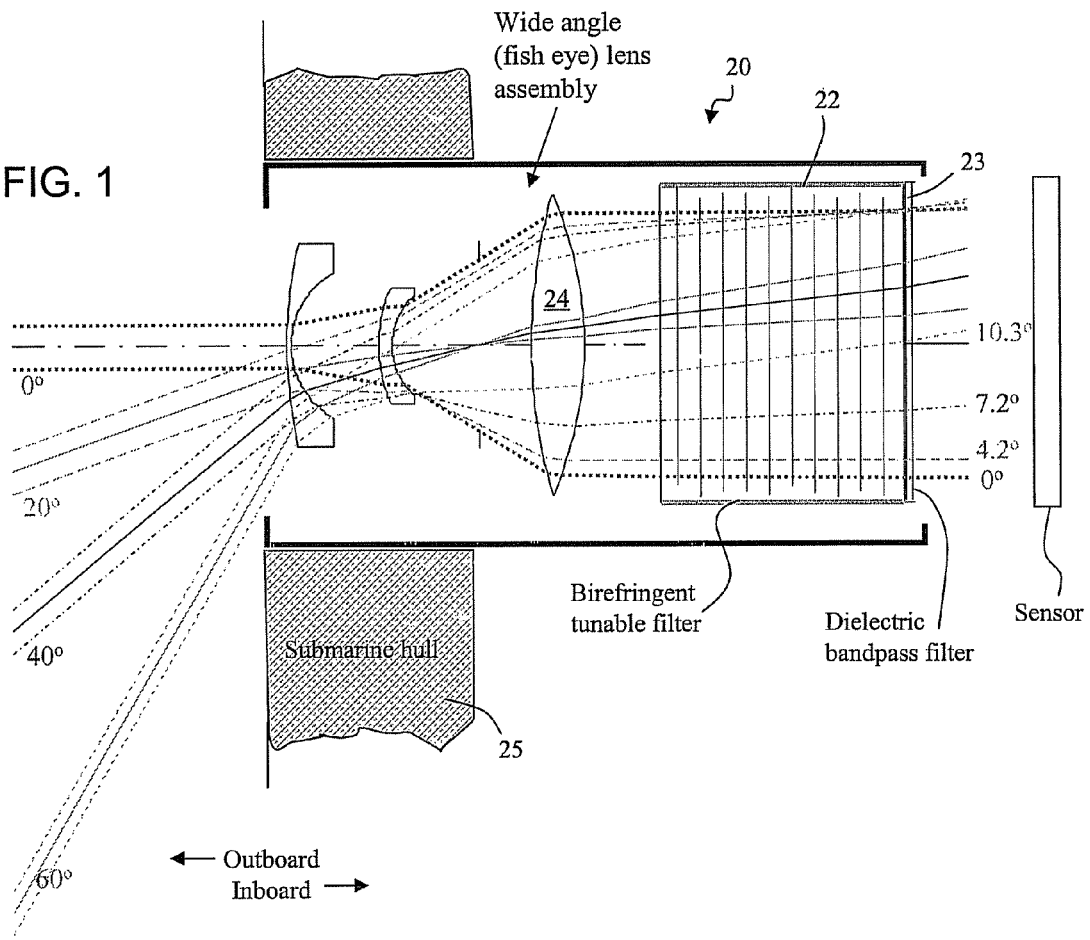

An optical receiver comprising a birefringence optical filter is disclosed herein, having a relatively wide field of view angle and a spectral filter apt for operation at short blue and green wavelengths, preferably capable of efficiently switching between operation at different short wavelengths. The spectral filter can comprise a set of birefringent differential retarder plates, preferably in cascaded stages. The retarders in a stage are arranged at particular rotational angles relative to one another and relative to at least one associated polarizer to produce a periodic comb filter transfer function. The transfer functions of stages in cascade are superimposed. In this respect, the subject matter can incorporate filter configuration aspects of U.S. Pat. No. 6,992,809 and pending application Ser. No. 11/537,233, filed Sep. 29, 2006, the disclosures of which are hereby incorporated into this description, in their entireties.

The disclosed receiver includes a spectral filter operable to discriminate for a narrow wavelength pass band. In connection with signaling, a high degree of discrimination is advantageous because modulation of light energy in the passband can be distinguished from ambient and background light, especially sunlight. High discrimination also permits operation using high gain amplifiers without undue problems with background noise.

In an ideal configuration, all the light energy to be filtered propagates along lines that are normal to the planes of the respective retarder plates and polarizers. If the material of the retarders is equally birefringent, all the energy of light rays normal to the plane of the retarders propagate through birefringent layers of comparable material and equal thickness. This configuration is ideal in that the relative thicknesses and angular orientations can be arranged precisely as required to operate, for example, according to one of the classic birefringent filter arrangements (e.g., Lyot, Evans, Solc, etc.). In imaging applications, it may be desirable to attempt to provide for light rays that are collimated and substantially parallel for spectrally filtering a pixel array of points in an image.

By comparison, if light energy propagates in a direction oblique to the center axis (i.e., other than normal to the planes of the retarder plates), which is characteristic of light radiating from a point, that energy traverses retarder thicknesses that are greater than the thickness traversed by normal lines. The difference in thickness affects the center wavelength of the birefringent filter stack. However, a particular sequence of relative rotation angles for the retarders is disclosed, which has been found to filter effectively in a manner tolerant of light propagation at an oblique angle. A configuration is disclosed wherein transmittance of light propagation at the bandpass wavelength oriented oblique to normal may be reduced compared to propagation normal to the parallel retarder planes, but is still substantial (e.g., about 70% of the transmittance at normal) at an oblique angle of ±10°.

In the disclosed environment of signaling, one or more signal paths is provided on which information to be transmitted is modulated by time or wavelength divisions. In connection with wavelength division multiplexing, it is possible to carry plural contemporaneously parallel channels on one signal, but the light travels along one path. Similarly, pulse or amplitude modulation arrangements, there may be a single signal path from source to receiver. Transmission through a light scattering diffuse medium may cause some of the signal to diverge, but there remains one functional signal path on which information is carried by modulation of the signal in time and/or wavelength. In this respect, signaling applications differ from spectral filter imaging applications, because in imaging, an array of inherently parallel signal paths are needed for separately transmitting and resolving pixels in an image.

According to one aspect of this disclosure, for signaling applications, an input lens arrangement that collects light over a wide field of view. The lens effectively distorts the image field in the manner of a fisheye lens configuration, but functions advantageously for sensing one amplitude (or one amplitude at a tuned wavelength). The light lens configuration refracts the collected light and the light is transmitted at a more modest range of oblique angles around the optical center axis. This light is propagated through a spectral filter comprising stacked birefringent retarders, arranged normal to the center axis of the input lens and configured to impose a particular polarization alignment tunably selected wavelengths. The discriminated wavelengths, in a comb filter characteristic, are selected by using one or more polarizers aligned at a predetermined orientation to the retarders.

The disclosed lens arrangement has a field of view of up to ±60° from the center axis, in which light can be collected from diffuse medium, or in a clear medium, light can be received without substantial attenuation, from a light source on a bearing that is oblique to the center axis. In one embodiment, incident light over a field of ±60° oblique to the center axis is collected over a lens aperture of at least an inch in diameter, and is partially collimated to a range of approximately ±10° from the center axis.

The disclosed spectral filter comprises at least one stage and optionally a cascaded series of stages. Each stage comprises a stack of birefringent retarder plates that are coordinated as to thickness and rotational orientation together with at least an output polarizer that passes polarization components that are aligned to the polarizer and blocks components orthogonal to the polarizer.

Several embodiments are disclosed that are particularly tolerant of an angle of off-axis alignment of propagating light, i.e., divergence from a path normal to the retarder plates. The input lens arrangement collects light over a wide field of view and by refraction directs the light at angles that are more nearly parallel to the filter axis, namely more nearly normal to the planes of the successively stacked retarders. In this way, the filter and the receiver as a whole are optimized for laser communications between a sending source and the receiver, wherein the directional bearing between the source and the receive is not known, and/or when the communications are undertaken in a diffuse light scattering medium, such as when using a laser for signaling between of sender and receiver of which at least one is mobile. A primary example is signaling between submarines by laser at relatively short wavelengths, which advantageously should be effective over a wide field of view to adapt to situations in which the line of sight between the source and the receiver may vary, or scattered light may be collected generally from a diffuse medium over as wide a field of view as possible.

The filter stages furthermore are tunable by liquid crystal elements that are optically aligned with fixed crystal retarders and are electrically controlled to adjust the birefringence of the pair. The liquid crystals of all the paired fixed/tunable retarders are electrically controlled in unison to adjust the bandpass wavelength. In the case of an obliquely input laser beam, tuning can compensate for the added thickness traversed by light passing obliquely through the stacked retarders.

Embodiments of spectral filters as described herein also comprise combinations of birefringent interference filters with stacked retarders and a polarizer, plus a dielectric filter. However, particular aspects of the invention can be exploited using other filter types and filter configurations in a similar manner. In a comparison of potential filter technologies, the following Table I compares selected specifications of typical spectral filter types:

TABLE I

Comparison of Spectral Filter Categories

| | Dielectric interference filter | Volumetric holographic filter | Air gap Etalon | Acoustic tunable filter | Tunable liquid crystal birefringent filter |
|---|---|---|---|---|---|
| FOV[1] | <3° | <3° | <1° | <3° | 5~10° |
| FWHM | <0.5 nm | >2 nm | <0.1 nm | >2 nm | <0.25 nm |
| Out-of-band rejection (at 1 nm FWHM) | High | Low | Low | Low | High |
| Transmission (1 nm) | >50% | >70% | >20% | >50% | >40% |
| Temperature sensitivity (1 nm) | High | Low | High | Tunable correction | Tunable correction |

This comparison suggests that two filter technologies that have advantageous and complementary specifications for use in a spectral filter of a receiver as described are the dielectric interference filter and the birefringent filter technologies. A volumetric holographic filter, Fabry-Perot etalon or acoustic tunable filter generally have limited field of view. Furthermore, it would be counterproductive to pair a limited field of view element with one chosen for wide field of view because the smaller field would govern.

Among the technologies compared, a birefringent filter uses interference with distinct polarization state selection. The other candidate technologies involve interference of light propagating on different optical paths. For optical systems with two (or more) optical paths designed to achieve constructive or destructive interference at a particular point, the design point (or the point at which the interference actually occurs) is specific for given field of view. A birefringent filter works differently in that the interference of light is between two different polarizations of light that share the same optical path.

It is envision a birefringent filter that has no angular field dependence so long as the birefringent element(s) used in the filter produce the same retardation for all angles through which light may propagate through the filter, including normal and oblique angles. This generally requires variation in one or both of birefringence and retarder thickness proceeding from a center of the birefringent element radially outwardly.

For example, a field of view compensation film used for a wide viewing angle Liquid Crystal Display (LCD) may have a full field of view as large as 170°. By carefully designing the optical axis orientation and the thickness of a birefringent film to complement the lines along which light can propagate, such a film can improve the operable field of view served with a birefringent filter.

A narrow band dielectric interference filter (narrow in this context would include a bandwidth of substantially 1 nm or less (at Full Width at Half Maximum) is sensitive to the angle of light incidence and also sensitive to ambient temperature. The transmission peak wavelength can shift by a wavelength difference that is larger than the FWHM bandwidth of the bandpass peak as the incident angle becomes larger. This situation is problematic, particularly with cascaded filter stages that are to be tuned to pass particular peaks of the respective filter characteristics of the stages. Modest ambient temperature variation can also cause the transmission peak wavelength to drift, possibly by a deflection that is greater than the width of the passband of another stage.

An optical filter according to the present disclosure, namely for under-sea communication or communication in a comparable situation, advantageously has a combination of relatively narrow bandwidth, high transmission, high out of band rejection and large acceptable field of view.

A requirement of narrow bandwidth dictates that the filter should have a high wavelength discrimination capability. However, high discrimination can reduce the transmission of the filter at the discriminated wavelength. A potential filter configuration with a narrow bandwidth may be intrinsically sensitive to the incident angle of light from the field of view. As discussed above, a variation in angle of incidence from normal to oblique may carry a difference in the traversed thickness of a birefringent retarder configuration at an oblique angle, that is sufficient to shift the band pass wavelength by more than the FWHM band pass width of the filter at normal incidence.

A conventional dielectric interference filter with narrow bandwidth likewise can have a transmission peak wavelength drift that is larger than the FWHM bandpass of the filter, in particular if the incident field encompasses more the ±10° or 15° from the optical centerline. In connection with undersea laser communications, a drift of a magnitude that is substantial compared to the pass band width is not acceptable. Not only may the transmission ratio for the laser signal at the desired wavelength drop off with angle of incidence (i.e., the transmission ratio in the passband drops), but the drift in the transmission band can lead to leakage, namely an undesired transmission light energy in background wavelengths, especially from sunlight. The out-of-band rejection characteristics suffer, leading to a reduction in signal to noise ratio.

Good temperature stability is another issue similar to the influence of angular variations across the field of view. Many narrow bandpass optical filters have strong temperature dependence. If the drift in the transmission peak wavelength (due to temperature variations or otherwise) is larger than the FWHM bandpass of other elements of the filter, then the optical filter may block the desired laser wavelength and/or transmit undesired background noise such as energy from out of band sunlight.

The following Table II is a list of specifications to be achieved in an optimized light receiver and filter for undersea signaling applications.

TABLE II

Target Specifications for Undersea Communications Receiver

| | |
|---|---|
| Tunable Passband (Dual band) | 480-490 nm, 520-540 nm |
| Rejection band | UV-480 nm, 490 nm-520 nm, 540 nm-NIR |
| FWHM @ 530 nm | 0.7 nm |
| Tuning Accuracy | 0.05 nm |
| Tuning resolution | 0.01 nm |
| Out-of-band rejection (0° FOV) | $10^3$:1 |
| Peak Transmission (@ 530 nm, 0° FOV for polarized input light) | 30-50% (birefringent filter) |
| FOV | ±40° (in water), ±60° (in air) |
| Temperature Coefficient (Without active self-calibration) | Peak drift = 0.02 nm/° C. |
| Limiting clear aperture | 18 mm |

Referring to FIG. 1, a high data rate undersea laser communication system can be provided as discussed herein, using a tunable center wavelength optical receiver 20, preferably comprising a spectral filter 22 containing one, or two or more cascaded stacks, of liquid crystal tunable birefringent filter elements, coupled to a wide angle light collection lens assembly 24. The depicted embodiment further comprises a dielectric bandpass filter stage 23.

Figure 2:
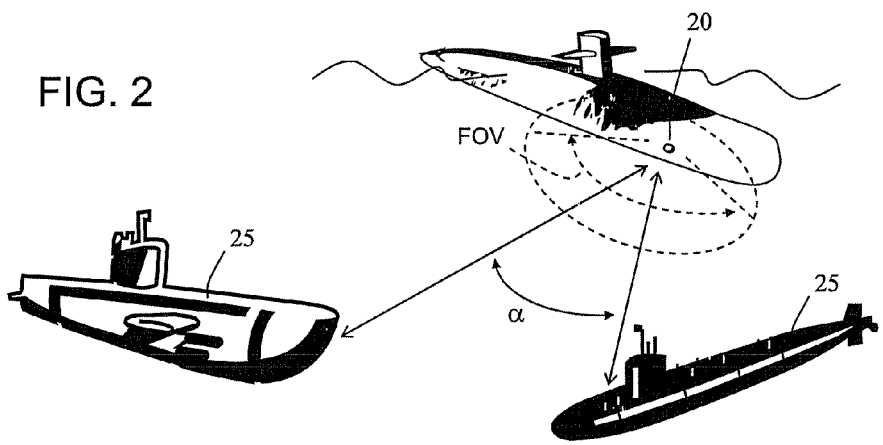
FIG. 2 is a figurative illustration of undersea communications employing the disclosed receiver.

A receiver as shown can collect light energy that is incident from a wide range of angles into the receiver and simultaneously filtering out solar background noise. Referring further to FIG. 2, the receiver is useful for communications in a light scattering medium such as sea water, because light can be collected over a substantial angle "FOV" around a center axis of the receiver, thereby collecting some of the scattered light. Furthermore, as the receiver and corresponding sender(s) 25 move relative to one another, the light signal can be acquired, and subjected to narrow band wavelength bandpass filtering, over a wide angle α over which the signal from the source may be incident on the receiver at angles oblique to a center axis. Accordingly, it is not necessary to aim the receiver toward the source, at least within the field of view FOV, in order to acquire and spectrally filter the signal.

In one embodiment, the tunable optical filter based on a birefringent interference filter design with polarizer and retarder arrangements that are tolerant of a relatively wide field of view. In the circumstances disclosed, the receiver 20 and filter 22 provide a higher optical energy throughput of polarized light in the pass band, and also higher out-of-band rejection, as compared with conventional Lyot, Solc, and Evans birefringent filter designs that also comprise rotationally oriented birefringent retarders and polarizers.

The tunable optical filter system, according to one embodiment, comprises liquid crystal optics, birefringent crystal optics, a wide angle polarizer, and a dielectric band-pass filter, coupled to a wide angle light collection lens. Drive electronics and control software operate to tune the liquid crystal optics, especially to adjust the birefringence of stacked retarders in at least one stage in unison, and optionally to adjust plural cascaded stages so as to tune the band pass wavelength of the combined stage transfer functions.

FIGS. 3-5 show several schematic arrangements wherein birefringent retarders are placed at rotational orientations relative to one another and relative to associated polarizers. The retarders each comprise a fixed birefringent crystal 39 and a tunable liquid crystal 37, rotationally aligned and abutted, i.e., so that their respective fast and slow optical axes are aligned. Thus, electrically varying the birefringence of the liquid crystal 37 tunes the retardation of the liquid crystal and fixed crystal assembly 37/39. A plurality of such assemblies are provided in each stage (one stage being shown in each of FIGS. 3-5. Light energy having a predetermined polarization alignment, for example defined by an optional input polarizer, has a vector component aligned to the fast axis and an orthogonal vector component aligned to the slow axis. Propagation through the retarder causes differential retardation of these components. The retardation changes the polarization alignment of the propagating light, which then encounters the next retarder. For particular periodically related wavelengths, namely the pass band wavelengths, the changes in polarization state through the retarders result in an overall rotational displacement that corresponds to the alignment of the output polarizer, whereas orthogonal components, namely out-of-band wavelengths are blocked. Configurations for tunable birefringent retarder spectral filters are disclosed in U.S. Pat. No. 6,992,809 and pending application Ser. No. 11/537,233, filed Sep. 29, 2006, the disclosures of which have been incorporated herein by reference, in their entireties.

The retarder plates (specifically the assemblies of liquid crystals 37 and fixed retarders 39), which can be provided in at least two cascaded stages, are provided in FIGS. 3-5 as one of two retarders respectively oriented at 22.5° and 67.5° relative to a reference angle; three retarders respectively oriented at 12.5°, 45° and 77.5° relative to a reference angle; and, four retarders respectively oriented at 7.5°, 29.5°, 60.5° and 82.5° relative to a reference angle; wherein the reference angle is one of parallel to and orthogonal to the polarizer "P" for bandpass or bandstop operation.

For undersea applications, the tunable filter has selectively tunable central wavelengths for blue and green wavelengths, which allow maximum flexibility in communication wavelength selection for different undersea water conditions. In one embodiment, a large tunable range of the filter configuration, combined with active temperature drift compensation (or active self-diagnostic self-calibration) cancels or offsets transmission peak wavelength drift, over a range of operating temperatures.

The wide angle light collection optics collect a maximum amount of light over a wide range of incident angles. In one embodiment, the optical filter has a wide Field-Of-View (FOV) of at least ±45°, and a large clear aperture (up to 3" diameter). The filter has a narrow bandwidth (Full Width Half Maximum bandwidth less than one nm), high optical throughput (40-50%) and high out of band rejection ratio (greater than 1000:1). A polarization independent design is disclosed wherein light in the passband that is orthogonal to an output selection polarizer is recycled by reflective techniques, increasing the transmission ratio of light in the passband.

The receiver shown in FIG. 1 has three major subsystems. In alternative embodiments also disclosed, two additional subsystems (not shown in FIG. 1) are provided, one for self calibration and another for recovery of passband wavelength energy that was rejected (because the rejected light was initially orthogonal to the component that was transmitted through, eventually, to become the output passband.

According to the disclosed embodiment, incoming light energy propagates through sea water or the like to receiver 20, for example as a pulse code modulated laser signal from a mobile transceiver 25. Ideally, the sender may direct the beam in the direction of the receiver 20. However even if well aimed, the orientation of a line of sight (bearing and elevation) are unknown because the sender and the receiver have no required or predetermined relative positions and orientations. Alternatively, the sender may emit a signal in a general direction into a diffuse medium. In any event, the receiver 20 is arranged to receive light energy over a wide field of view (FOV).

At the input to the receiver, for example installed in the hull or on the outer surface of the undersea vessel, a wide angle (fish eye) input lens assembly collects light over an incoming field of view ranging ±60° relative to a central axis. By refraction occurring at interfaces between materials with different indices of refraction, the light energy is redirected, in a known manner with respect to lenses. As shown in the example illustrated graphically, an incoming FOV of ±60° relative to the central axis is reduced to a divergence of approximately ±10° relative to a central axis.

A pre-filter subsystem 32 is provided with a fixed dual band-pass characteristic. This subsystem can comprise a dielectric filter with passbands, for example at predetermined center wavelengths in the blue (486 nm) and green (530 nm) visible spectrum. Other wavelengths likewise can be used, it being understood that short wavelengths in the visible spectrum are more readily transmitted through water than longer wavelengths. The prefilter subsystem 32 can have relatively wide passbands compared to the pass band width of the birefringent filter. In one embodiment, the a dielectric interference type prefilter has a FWHM bandwidth of about 5 to 20 nm, for example. It is desirable that the prefilter have a bandwidth sufficient to pass all wavelengths in the tunable range of the birefringent filters, because these filter elements are placed in cascade. Any wavelengths outside of the passband of either of the filters will be blocked or at least attenuated according to the respective filter characteristics.

The "pre" filter subsystem 32 can be disposed in front of the other filter stages or behind them. Inasmuch as the filter stages are in cascade, overlapping passbands anywhere the cascade tend to reinforce one another and any stopbands in any stage prevents transmission in that band even though the band may be transmitted by another stage.

The tunable birefringent filter 22 preferably has a narrow band-pass filter characteristic, for example with a band width of 0.7 nm (FWHM). The birefringent filter 22 preferably has an acceptable field of view at least greater then 7.5° and preferably greater than ±10° and a tunable range greater than 10 nm that can cover both the blue and green wavelength channels.

The configuration shown in FIG. 1 does not include two optional subsystems, namely a polarization recycling system, and an active self-calibration system. These are discussed in detail below with reference to FIGS. 13 and 14.

Briefly, the polarization recycling system comprises one or more of a reflective wiregrid polarizer and a polarization recycling cube (or achromatic quarter wave plate with reflective mirror) constructed according to the teachings of the U.S. patent application Ser. No. 11/611,924, filed Dec. 18, 2006, which is hereby incorporated in this disclosure in its entirety. According to the present application, the technique comprises collecting the rejected polarization component that fails to be transmitted through a polarizer, for example using a reflective type polarizer, and producing an optical path with reflections that direct light energy at the bandpass wavelength back into the forward propagation path.

The active self-calibration subsystem comprises a light source such as a white flashing LED, and a compact spectrometer. A controller operable according to a feedback control algorithm is coupled to an output of the spectrometer and arranged in to tune the birefringent filter 22 so as to counteract the effects of temperature drift in real time. This technique for controlling the center wavelength at the transmission peak wavelength is discussed below with reference to FIG. 13.

A large acceptable field of view tunable birefringent filter design might be designed wherein a field of view compensation film is applied. Without a field of view compensation film to increase the field of view, which may be a complicated prospect, the acceptable field of view for a birefringent filter may be limited to about ±10 to 15° (in air) relative to a center axis normal to the plane of the retarder plates. The field of view is limited because oblique propagation traverses a greater thickness than propagation along a line parallel to the central axis normal to the plane of the retarder plate, and a birefringent filter as described has a comb filter transfer function that is stretched out compressed inward along the wavelength scale by a change in birefringence. The change in birefringence advantageously is tunable by application of a control voltage a liquid crystal, which is equivalent to altering the thickness of the retarder. Thus, a filter typically de-tuned for oblique rays as compared to normal rays.

One way to increase the acceptable field of view of the birefringent filter 22 is to use a wide angle fish eye lens or lens combination such as the lens assembly 24 shown in FIG. 1. Refractive "fish eye" lenses are available from Nikon or Pentax and are useful for collecting light over a large field of view. In an imaging application, such a lens might be used to focus an image on a plane. In the present application, a similar lens is used to reduce the angular divergence inherent in a wide incident field of view, for example by a factor of four to six. For example, as shown in FIG. 1, a 60° incident field of view (in air) can be reduced to an oblique divergence that is about 10° for an incident light beam at the lateral edges of the field of view. A 60° angular span in air will correspond to a 40° span in water due to difference in index of refraction.

A 10° oblique field of view is within a reasonably acceptable range of angular diversion, from normal to oblique, for a birefringent filter, particular for the configurations shown in FIGS. 3-5. A 7.5° field is also possible, or the angle may range between these angles, for example from 5° to 15°. A 7.5° to 10° field provides good results in the configurations shown. FIG. 6 is a graphic illustration (mathematically modeled) of the expected reduction in transmission ratio at the pass band, comparing an ideal 50% ratio for randomly polarized light in the passband oriented parallel to the optical center axis (normal to the plane of the retarder plates) versus the ratio at a maximum 10° oblique orientation relative to parallel to the center axis. It is seen that the transmission ratio at the less than ideal orientation is still better than half the ratio in the ideal case. Another salutary aspect of reducing the effective view using a refractive lens assembly is to reduce the potential pass band shift that may affect the extent to which the pass band remains within the passband of the fixed dielectric bandpass filter.

By including a wide angle lens to reduce the field of view, the technical requirements of the birefringent filter and the fixed (dielectric) bandpass filter are somewhat relieved, reducing the potential complexity of the birefringent filter that might be necessary to operate in the transmission peaks of the fixed bandpass filter and to maintain a good transmission ratio.

The limiting aperture of the overall optical system is determined by the limiting aperture on the fisheye lens. It is possible to custom design the fisheye lens to have a large limiting aperture and a small exit aperture, which is apt for the signaling application of the invention. The clear aperture required for the birefringent filter advantageously matches the exit aperture of the fisheye lens, but the clear aperture of the birefringent filter can be substantially smaller than the limiting aperture of the fisheye lens. This reduces the cost of the filter system.

A custom refracting lens also can be designed to substantially collimate incident light over the field of view for propagation at nearly normal incidence to the aperture of the birefringent filter. Provided that the passband light is simply to sampled or otherwise measured as to amplitude (as opposed to resolution into an image field), a corresponding collimating lens on the output side can concentrate the light energy on a detector. A custom designed light collection lens on the input side can substantially reduce the truncation of light at the limiting aperture and vignetting at a large field of view, thereby improving the light collection efficiency of the overall filter system.

Control of the tunable liquid crystals in the birefringent filter, which can have one or more cascaded stages, can include the selective tuning of the filter to particular selected passbands at green and blue wavelength regions apt for light transmission in water. According to one embodiment, a dual band-pass dielectric filter is provided, with one pass band at 480 nm to 490 nm and a second passband at 520 nm-540 nm. The fixed dielectric bandpass filter can reject a wide wavelength region from UV to NIR at very high rejection ratio, while providing passband windows in which the birefringent filter can be tuned. Although the birefringent filter stages characteristically produce comb filter transmission characteristics, the birefringent filter or at least one or more stages of the birefringent filter in cascade with the dielectric filter, can readily be tuned to select exclusively either the blue or green wavelength range, while maintaining the continuous tuning capability for adjusting the transmission peak wavelength of the birefringent filter in either of the two pass bands. In one embodiment, the FWHM of the birefringent filter has been specified as 0.7 nm. However, a narrower or wider bandwidth is possible and can be specified to optimize the performance of the optical receiver in the communication system. A suitable fixed band-pass dielectric filter is available from Barr Associates, Inc. of Westford, Mass. Alternatively, this dielectric filter may also be obtained from Omega Optical, Inc. of Vermont, USA.

The performance characteristics of the birefringent filter of this disclosure are shown graphically in FIGS. 7-10 below. FIGS. 7 and 8 show generally the transmission envelopes obtained in the blue and green areas of the spectrum, obtained by tuning the filter successively to center wavelengths spaced slightly apart. The transmission ratio at intermediate wavelengths can be inferred from the shape of the envelopes as shown. In FIG. 7, the tuned center wavelengths are 2 nm apart in a range of 482 nm to 494. In FIG. 8, the wavelengths are 8 nm apart in a range of 510 nm to 542 nm. These transmission characteristics are obtained by the structural filter designs illustrated in FIGS. 11-12 below. These designs are exemplary embodiments that provide narrow transmission bandwidth, large acceptable field of view and large out of band rejection.

The birefringent filter designs as discussed herein can include field of view compensation aspects. For example, coatings can be applied that affect the field of view, the birefringence of the retarders can be varied spatially in radial bands or other areas, the filter or a filter stage can be tuned to successive wavelengths in timed sequences (e.g., scanning repetitively through a wavelength tuning band) so as to respond to light energy that may be propagating obliquely.

It is desirable that the wavelength peak remains at the same wavelength as the zero field of view, i.e., normal to the parallel planes of the retarders. In the disclosed multi-conjugate filter configurations, at an incident field of view smaller than 7.5° at the multi-conjugate filter, the peak transmission wavelength is substantially the same as at a 0° field of view (all light propagating parallel to the center axis). The transmission ratio remains high. At a 10° field of view at the filter, the transmission of the filter starts to decrease. Advantageously, the effect is a reduction in transmission ratio and not a drift in the center wavelength.

FIG. 9 shows that for the fixed 7.5° incident field of view, the azimuthal incident angle can range from zero to 270° and presumably even higher. Similar to a liquid crystal display, some filter designs may not have a highly symmetrical field of view. However, in case of the birefringent filter designs according to the present disclosure, the field of view is symmetrical for incident angles of 0°, 90°, 180° and 270°. This means that light from all directions has similarly acceptable field of view.

FIG. 10 is a logarithmic graph chart showing modeled out-of-band rejection ratio for 0° field of view for a birefringent filter according to one embodiment of the disclosed filter.

Figure 11:
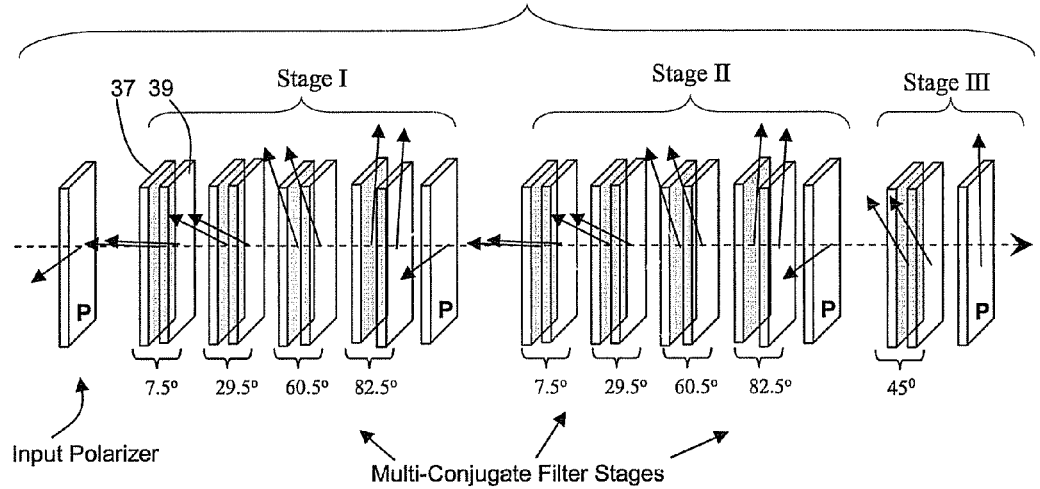
FIG. 11 is a schematic representation of a multi-conjugate cascaded stage filter according to one embodiment.
Figure 12:
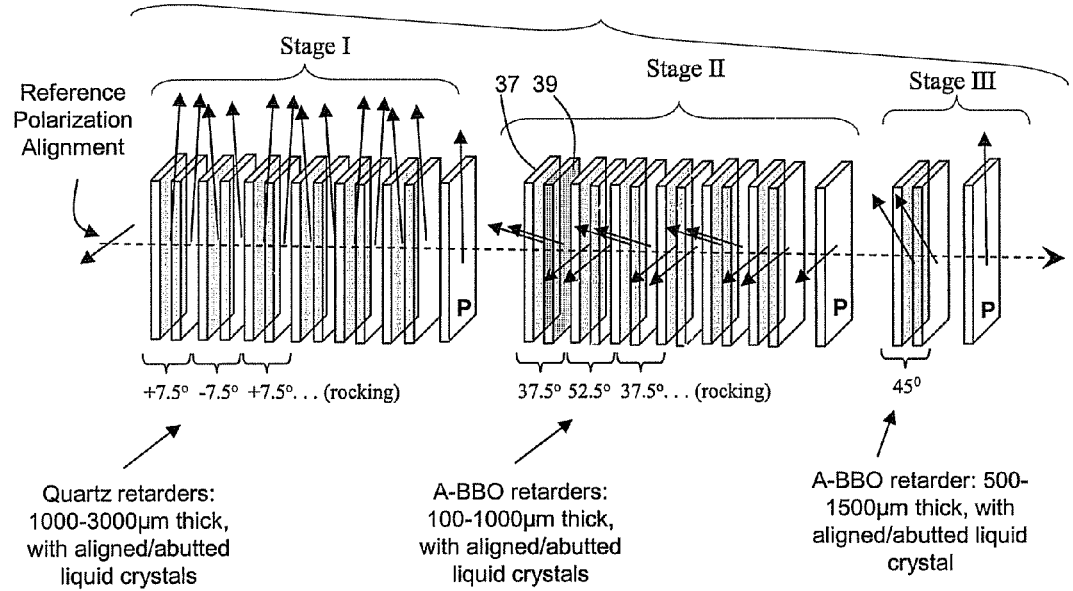
FIG. 12 is a schematic representation of another embodiment.

FIGS. 11-12 show two distinct configurations for three stage birefringent tunable filters. In FIG. 11, two of the three filter stages each has four retarder pairs with rotational orientations relative to an input polarizer as shown in FIG. 5. That is, each of stages I and II has four pairs of retarders (a "pair" comprising a birefringent crystal combined with a liquid crystal controlled to contribute birefringence along the same fast and slow axes). The four pairs have respective optical orientations (relative rotation from that of the input polarizer) of 7.5° for the first pair, 29.5° for the second pair, 60.5° for the third pair, and 82.5° for the fourth pair. The retarder thicknesses in this embodiment are equal, such that the extent of the birefringence of the pairs is equal and is variable by tuning the associated liquid crystals in each pair. Such tuning is done in unison.

Each filter stage has a comb filter transmission characteristic. By varying the birefringence of all the retarder pairs of a stage in unison, the retarders in each pair total more or less birefringence, but the pairs remain equal. The effect of tuning in unison is much the same as changing the thickness of all the retarders in the stage. The filter stage has a comb filter transmission characteristic. Tuning the filter causes that comb shaped characteristic to become elongated or compressed on the wavelength axis. Compressing the characteristic tends to narrow the width of the pass bands. Elongated the transmission characteristic tends to increase the free spectral range between peaks.

If the stages in FIG. 11 are tuned such that bandpass peaks overlap, the cascaded combination is a bandpass peak, typically with a narrower pass band width that the characteristic of either stage alone. If the stages are tuned such that a bandpass peak of one stage corresponds to a stop band in another stage, that wavelength is blocked.

The orientation angles shown in FIGS. 11 and 12 are measured with respect to a reference polarization alignment that can be the optical axis of an input polarizer as shown in FIG. 11. (The polarizers are each marked "P" and labeled for the alignment at which the respective polarizer will transmit plane polarized light.) An input polarizer actually is optional because the filter will discriminate for periodically related wavelengths that have a given input polarization alignment in any event. However in FIG. 11, the input polarizer shows the reference angle corresponding to zero degrees in FIGS. 3-5. The third and last retarder stage in FIG. 11 has one retarder pair at a 45° angle, and the final selection polarizer at the output of the last stage ultimately selects for those wavelengths that emerge from the preceding stages at a polarization alignment parallel to the final polarizer, and blocks wavelengths that are orthogonal thereto. In each case depicted, each polarizer comprises at least one liquid crystal 37 and at least one fixed crystal 39. However it is possible that only certain stages might be made tunable so as to select for bandpass peaks in the transmission characteristics of other sections.

In FIG. 11, the orientation angles tend to progress, but in the configuration of FIG. 12, the orientation angles of each retarder pair in stages I and II is rocked in alternate directions. The rocking angle in this case is plus and minus 7.5°. The angle may be ±7.5° in the vertical direction or ±7.5° in the horizontal direction as shown by respective stages in FIG. 12. The stage-III angle in FIG. 12 is the same as in the embodiment of FIG. 11, leading again to a final selection polarizer.

The fixed retarders 39 in stages I and II in the embodiments of FIGS. 11-12 may comprise BBO (Beta Barium Borate) retarders each having thickness in the range of 100-1000 μm. Alternatively, the stage-I fixed retarders may comprise quartz retarders (having thickness in the range of 100-1000 μm) whereas stage-II fixed retarders may be BBO retarders as shown, for example, in the embodiment of FIG. 12 (but, can equally be implemented in the embodiment of FIG. 11). In another embodiment, all the fixed retarders in stages I and II in the embodiments of FIGS. 11-12 may comprise quartz retarders having the thickness range mentioned above. In stage-III in each of the embodiments of FIGS. 11-12, the fixed retarder can be of thickness 500-1500 μm and can comprise either a BBO retarder or a quartz retarder with comparable results.

The disclosed embodiments comprise three filter stages in cascade, but this number of stages is simply exemplary. A larger number of stages can be provided in other embodiments that are likewise within the scope of the disclosure, or the number of stages can be reduced.

The respective filter stages in the embodiments of FIGS. 11 and 12 can comprise any of various types of polarizers "P". These include an absorbing type polarizer (wherein the rejected polarization component is absorbed, for example by oriented dichroic molecules), a wire or other conductive grid polarizer (wherein the rejected polarization component is substantially reflected opposite to the angle of incidence), a crystal polarizer (wherein the rejected polarization component is diverted from the passed polarization component), or another similar type.

The liquid crystals applied to the fixed retarders to provide tunable birefringence can be selected from the available liquid crystal materials and structures, for example as disclosed in the references that have been incorporated by reference.

It is possible to further broaden the field of view provided by the filter structures of the embodiments of FIGS. 11 and 12 by employing a pair of liquid crystal retarders associated with each fixed retarder, as opposed to only one as shown in FIGS. 11 and 12. A liquid crystal typically comprises a liquid crystal material between two structural supporting plates held apart by a spacer, and having transparent indium tin oxide coatings facing the liquid crystal material for making electrical contact and a rubbed or similarly treated alignment layer that determines the at-rest alignment of the liquid crystal molecules. Two or more liquid crystals can be stacked, optionally sharing an intermediate supporting plate between them. By specifically aligning two or more liquid crystals so as to have antiparallel rubbing directions, the stacked liquid crystals have a wider field of view than one liquid crystal or two that are not oriented in directly opposite rubbing directions. This configuration with two-to-one ratio of liquid crystals per fixed retarder, may be employed for each fixed-tunable retarder pair in each stage of either or both of the filter configurations illustrated in FIGS. 11-12. The use of stacked tunable elements also makes possible additional control operations involving one or the other or both of the stacked crystals in different situations.

The filters shown in FIGS. 11 and 12 are sensitive to the polarization of the input light signal. It would be possible to preprocess the light signal such that the light is plane polarized to the reference angle of the input polarizer. If instead the light is randomly polarized, the filter shown in FIG. 11 rejects incoming light that is orthogonal to the input polarizer, including light in the passband. Similarly, the component of the light signal that is orthogonal to the reference orientation in FIG. 11 will be rejected at the selection polarizers that follow the retarders in each stage.

Figure 13:
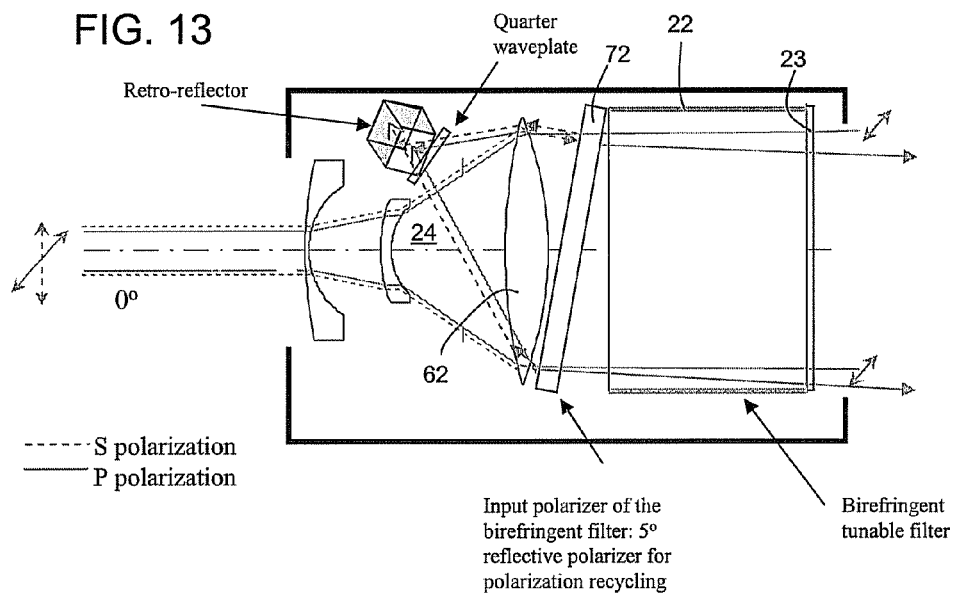
FIG. 13 is a cross section through an embodiment arrange to realign and recycle a rejected polarization component.

FIG. 13 illustrates an embodiment characterized by capturing light that is orthogonal to an input polarizer 72 that in this case can be a reflective polarizer such as a wire grid polarizer. The reflected light (namely the polarization component orthogonal to the input polarizer) is realigned and reprocessed, such that the optical filter is polarization independent. In an imaging application, polarizers might be chosen for absorptive characteristics, so as to minimize internal reflections. In the embodiment of FIG. 13, at least the input polarizer 72 comprises a wide angle type reflective polarizer, such as a wire grid polarizer. Wire grid polarizers can be obtained, for example, from Moxtek Inc. of Orem, Utah. The input polarizer in FIG. 13 is aligned at a 5° angle relative to a plane normal to the optical axis, and reflects the rejected orthogonal polarization component of the input signal to an off-axis assembly that realigns the polarization state of the rejected light and reflects the light back to the input polarizer in a polarization state that is transmitted through the input polarizer. This makes the filter operate on all the energy in the light signal in a polarization independent manner. In particular, this embodiment has an improved transmission ratio in the passband because light in the passband is not rejected for having an initial polarization state that is orthogonal to the reference polarization alignment of the filter.

If the incoming signal is randomly polarized, one of the orthogonal polarization components of the light is processed through the birefringent filter as discussed above. The polarization component that would be rejected by the birefringent filter (e.g., blocked at the outset by an input polarization filter) is reflected by the reflective 5° tilted polarizer 72 to a quarter waveplate and then through retro-reflector and back through the quarter waveplate to the input polarizer. The quarter waveplate is rotationally oriented at 45° relative to the alignment of the reflective 5° tilted input polarizer.

Thus the light propagation path, including two traverses of the quarter waveplate and reflection at the retro-reflector, causes the polarization alignment of the rejected light component to be rotated by 90°, into alignment with the input polarizer 72. The rejected light energy is reinserted and added to and filtered together with the orthogonal component that was initially passed through the input polarizer. Both components are filtered and contribute to the light that ultimately is incident on a photo detector (not shown in FIG. 13) in the receiver system.

The embodiment of FIG. 13 likewise benefits from use of a filter retarder stack configuration that is tolerant of oblique light propagation paths as described, because the recycled polarization component is reinserted from the off-axis position of the retro-reflector through a lens 62, the reinserted light propagates in a direction that corresponds to a position at the periphery of the external field of view.

FIG. 13 shows the foregoing polarization recycling embodiment schematically. In a practical arrangement, another collimating lens may be added to the schematic embodiment shown, namely in the off axis optical path of the rejected polarization component including the quarter waveplate, to improve polarization recycling efficiency.

Figure 14:
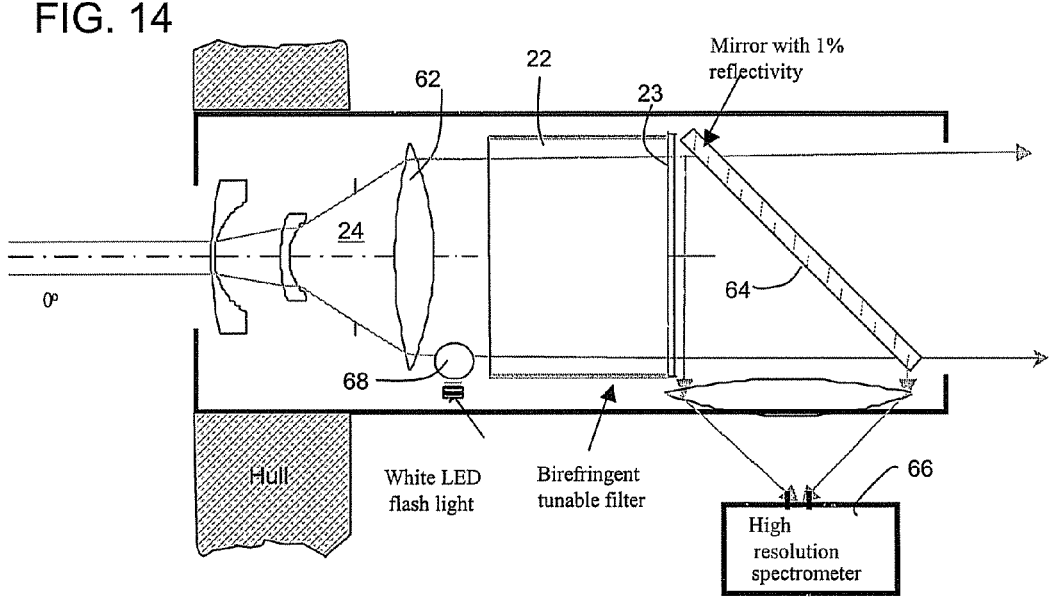
FIG. 14 is a cross section through an embodiment providing calibration and feedback control capabilities.

A further alternative embodiment that is arranged for environmental stability is shown in FIG. 14. This receiver is provided with feedback aspects. Feedback carries the ability to maintain the bandpass wavelength to a predetermined standard with environmental changes (especially temperature variation). With a suitable reference, the feedback sensing permits the bandpass wavelength to be controlled with respect to the reference. Alternatively, the bandpass wavelength might be tunably varied, for example to lock to an incident wavelength by controlling for maximum received amplitude. For these purposes, FIG. 14 shows a partially reflective mirror 64 (e.g.,1% reflective) inclined along the forward light propagation path to the photodetection stages (not show in FIG. 13), for diverting the filtered light signal to an off-axis spectrometer 66. The spectrometer can have an output (not shown) be coupled to the controls for the liquid crystal tunable elements 37 in the birefringent retarder stacks of filter element 22.

A wavelength self-diagnosis and troubleshooting capability is useful for everyday maintenance and field usage of an instrument. In the embodiment of FIG. 14, a reference light source 68, for example comprising an LED for producing a light signal with a known spectral composition, can be activated to provide a reference input. The spectrometer 66 is employed to resolve the resulting spectrum that is passed by the filter stack 22/23.

An important environmental parameter for the tunable filter is operational temperature, and ambient temperature is highly variable. The tunable filter configurations in the embodiments of FIGS. 11 and 12 are undamaged over a wide range of storage temperature range (e.g., −20° C. to about +60° C.). The normal operational range in which the filter should operate may be, for example, 15° to 35° C. A wider range may be specified for military use.

Aspects that influence filter stability include the responses of the electro-optical material (the Liquid Crystal material), the birefringent optics and the polarization optics, which are subject to variation with temperature, particularly if wide temperature fluctuations are encountered.

According to one technique, the operational temperature of the elements can be measured by thermocouples (not shown) that may be mounted among the assembled elements of the filter. A compensation algorithm can be used to compensate for temperature drift according to a temperature response characteristic. The characteristic can be determined by pragmatic measurements, namely by calibration steps. More particularly, the filter is characterized for its response to control voltages over a full working temperature range (a control relationship of passband center wavelength versus control voltage is developed that includes temperature as a variable). This characterization is then used later, for example in the form of a lookup table, to determine the control voltage needed to achieve a desired passband, and periodically referenced to conform to any temperature changes that occur.

According to another embodiment, the filter or elements thereof can be environmentally controlled to maintain a stable temperature. One or both of a heating element such as a resistive heater and/or a cooling system can be coupled to the filter, directly or with a circulating coolant arrangement, and controlled with feedback from the temperature sensor to ensure that working temperature of the filter remains at a nominal temperature.

The foregoing temperature control aspects are indirect. According to another embodiment, direct methods are supported to perform self diagnosis on the filter, to measure the filter performance by applying a reference light signal and examining the output of the filter, etc. The methods are also useful for trouble shooting if a failure should occur.

In FIG. 14, a controlled white LED is placed in front of the birefringent filter. A compact spectrometer measures the output. For troubleshooting or calibration, the LED is powered and generates a known spectrum into the tunable filter, for example a broadband white light, or at least a repeatable light signal having energy at wavelengths that can be detected in the output when the filter is operation nominally. The signal passed through the filter is reflected by the 1% reflective mirror onto the compact spectrometer. The spectrometer can have a small spectral range, for example limited to the blue and green bands of interest, but preferably has a reasonably high resolution.

The performance of the tunable filter is measured directly in this manner. The collected spectrum can be analyzed to correct for any residual difference between the programmed peak wavelength and the actual peak wavelength (i.e., to recalibrate). An operation failure of the filter or its components can be detected or analyzed to effect repairs. The data collected in this process can also be part of data related to long term stability and performance degradation.

Low temperature storage and operational stability may be considered when the tunable birefringent filter as described is used commercially. More or less demanding environmental conditions may be met in the selection of materials and structures, particularly for the electro-optical elements (the liquid crystals). For example, glass spheres may be selected as the spacers between supporting plates of the liquid crystals, such as one or a number of micron scale glass spheres placed in the inner cavity of the liquid crystal element between the plates. Glass spheres have a low index of thermal expansion, and reduce the extent to which the cavity containing the liquid crystal may expand or shrink with temperature fluctuations, thus altering the dimensions that determine the filter passband wavelength. Spacers also tend to reduce thermal stresses in the retarder stack.

From the liquid crystal material selection point of view, a liquid crystal material with excellent life time, stability, and low crystallization temperature may be used. A liquid crystal material with the combination of such parameters may result in a more stable filter performance.

The present disclosure has identified undersea laser communication between submarines as an application of this technology. The success of such system, including the practical range of communications and the data rate, are governed to a large extent by the capacity of the receiver to collect as much signal energy as possible. According to this disclosure, unwanted background noise, for example from sunlight, can be minimized to improve the signal to noise ratio. The optical filter system discussed above is arranged to optimize these aspects. The lens assembly for collection of light over a wide field of view and also the configuration of the retarder stack to tolerate oblique light propagation, at least up to 10° from an axis normal to the stack, provide performance.

The acceptable field of view of an undersea communication receiver should be large not only to maximize light collection, but also to enable the receiver to function at random relative positions of the submarines where the bearing between source and receiver is unknown and/or it is not readily possible to aim the receiver in the direction of the sender. The disclosed filter system provides a large field of view while maintaining a high transmission ratio in the passband, high out-of-band rejection and limited transmission peak wavelength drift over the field of view. The tunability of the filter enables calibration as well as operational capability over a wide range of environmental temperatures. Switching between blue and green pass band envelopes provides an ability to select the laser wavelength needed for given sea water conditions, while further enhancing the finesse of the filter system.

The applications of the invention are not limited to undersea applications, and are applicable for signaling in other environments, such as in the open air, where bearings between source and receiver are unknown or only generally known, and/or where a varying orientation of vehicles carrying the signal source and receiver making it difficult or impossible to achieve line of sight aiming along the optical axis of the receiver.

The disclosed filter technology can be configured either to detect narrowband light or to block narrowband light. Thus in a protective application, modification of the filter structure to re-orient the selection polarizers orthogonal to the polarization alignment of light emerging from the filter stage, rather than parallel to said polarization alignment, transforms the disclosed narrow bandpass filter into a narrow bandstop filter. Thus, the disclosed configuration can be made to block particular laser wavelengths from reaching the detector. A bandstop filter as described may be used to thwart hostile laser attack on a remote sensing imaging system.

The subject matter of this disclosure is useful over a range of applications, not limited to those discussed above. An important application of narrow bandpass tunable filters is in the biomedical area. Some biomedical applications operate in connection with hyperspectral fluorescence, hyperspectral near infrared and hyperspectral Raman imaging and spectroscopy. These techniques have applications in microbiology, tissue characterization, cancer detection, etc. A tunable filter according to the teachings of the present disclosure, can provide enhanced filter performance in terms of field of view and transmission ratio, and may be useful for imaging and non-imaging applications, with or without the disclosed lens assembly at the input.

For example, in current fluorescent imaging technology, use of a fixed bandpass filter on a microscope has limited discrimination for the fluorescence signal. A narrower bandwidth, tunable technology according to the teachings of the present disclosure can be useful to collect information on different fluorescence labels, especially for a sample stained with multiple fluorescence labels.

Other potential applications for the tunable filter design of the present disclosure range from remote sensing, tunable laser, color generation for display applications, Dense Wavelength Multiple (DWM) telecommunication, solar imaging for astronomy, etc.

The present disclosure includes a number of particular aspects and specific embodiments. These should be regarded as exemplary rather than limiting. Reference should be made to appended claims to assess the scope of the subject matter hereof.

What is claimed is:

1. An optical wavelength filter comprising:
a plurality of birefringent retarders and at least one polarizer disposed along a light propagation path defining an optical axis, wherein the retarders comprise stacked plates normal to the axis, rotationally oriented relative to one another and relative to the polarizer so as to discriminate for at least one of a passband and a stopband at a discrimination wavelength;

wherein the filter is configured to filter the discrimination wavelength over a filter field of view through the stacked plates that is at least ±7.5° oblique to the axis;

wherein the retarders comprise paired fixed birefringent plates and liquid crystals, abutted with one another such that at least one of said fixed birefringent plates and at least one of said liquid crystals have fast and slow axes that are aligned, and further comprising a controller operable to tune at least one stage containing said liquid crystals for adjusting the discrimination wavelength; and wherein the plates are configured in at least two cascaded stages and wherein at least one of the stages has paired birefringent plates and liquid crystals selected from the set consisting of:

two retarders respectively oriented at 22.5° and 67.5° relative to a reference angle; three retarders respectively oriented at 12.5°, 45° and 77.5° relative to a reference angle; and, four retarders respectively oriented at 7.5°, 29.5°, 60.5° and 82.5° relative to a reference angle; wherein the reference angle is one of parallel to and orthogonal to the polarizer.

2. The filter of claim 1, further comprising at least one lens preceding the retarders along the light propagation path, wherein the lens is configured to refract incident light over an external field of view and to couple to the incident light to the stacked plates of the retarders within the filter field of view.

3. The filter of claim 2, wherein the external field of view is between about ±60° and ±85° and the filter is configured to maintain at least one passband for a filter field of view ranging from normal to the stacked plates up to at least ±10° oblique to said axis.

4. The filter of claim 1, further comprising an input polarizer wherein the retarder and reflector assembly comprise a quarter waveplate oriented at 45° to the input polarizer and a retro-reflector configured to reflect back through the quarter waveplate into the light propagation path.

5. The filter of claim 1, wherein the a plurality of birefringent retarders and the polarizer define a plurality of filter stages in cascade, each of the stages having a selection polarizer at an output of said stage and at least one of the stages having an input polarizer preceding the stage, wherein said input polarizer passes one of two orthogonal components and diverts an other of said orthogonal components to a polarization realignment element, wherein the polarization realignment element reorients and re-inserts said other of the orthogonal components into the light propagation path, with a polarization orientation aligned to said input polarizer, whereby filter is independent of input polarization state.

6. The filter of claim 5, wherein polarization realignment element comprises a retarder operable to induce a polarization realignment and a reflector configured to reflect back through the retarder into the light propagation path.

7. The filter of claim 6, wherein the retarder comprises a quarter waveplate oriented at 45° to the input polarizer.

8. The filter of claim 5, further comprising at least one lens, wherein the input polarizer comprises a reflective polarizer that is located beyond the lens along the light propagation path, the input polarizer being tilted from normal to the propagation path to reflect a rejected polarization component laterally.

* * * * *